(12) United States Patent
Huang

(10) Patent No.: US 6,457,701 B1
(45) Date of Patent: Oct. 1, 2002

(54) STRAP TIGHTENER

(76) Inventor: Chi-San Huang, No. 2, Lane 167, Sec. 3, Chin-Ma Rd., Changhua City (TW)

( * ) Notice: Subject to any disclaimer, the term of this patent is extended or adjusted under 35 U.S.C. 154(b) by 0 days.

(21) Appl. No.: 09/837,717

(22) Filed: Apr. 18, 2001

(51) Int. Cl.[7] .......................... B25B 25/00; A44B 21/00
(52) U.S. Cl. ..................................... 254/217; 24/68 CD
(58) Field of Search .................................. 254/213, 217, 254/223; 24/68 CD, 69 CT, 69 ST, 71.1

(56) References Cited

U.S. PATENT DOCUMENTS

| | | | | |
|---|---|---|---|---|
| 3,749,366 A | * | 7/1973 | Brucker ................... | 24/68 CD |
| 4,185,360 A | * | 1/1980 | Prete et al. .............. | 24/68 CD |
| 4,227,286 A | * | 10/1980 | Holmberg ................ | 24/68 CD |
| 4,324,022 A | * | 4/1982 | Prete, Jr. ................. | 24/68 CD |
| 4,844,477 A | * | 7/1989 | Pardi ....................... | 24/68 CD |
| 5,103,536 A | * | 4/1992 | Kamper ................... | 24/68 CD |
| 5,205,020 A | * | 4/1993 | Kamper ................... | 24/68 CD |
| 5,282,296 A | * | 2/1994 | Huang ..................... | 24/68 CD |
| 5,369,848 A | * | 12/1994 | Huang ..................... | 24/68 B |
| 5,426,826 A | * | 6/1995 | Takimoto ................. | 24/68 CD |
| 5,560,086 A | * | 10/1996 | Huang ..................... | 24/68 CD |
| 5,778,496 A | * | 7/1998 | Huang ..................... | 24/68 B |
| 5,894,638 A | * | 4/1999 | Huang ..................... | 24/68 CD |
| 5,943,742 A | * | 8/1999 | Huang ..................... | 24/68 B |
| 6,139,234 A | * | 10/2000 | Huang ..................... | 410/100 |

* cited by examiner

*Primary Examiner*—Kathy Matecki
*Assistant Examiner*—Roberto DiMichele
(74) *Attorney, Agent, or Firm*—William E. Pelton, Esq.

(57) ABSTRACT

A strap tightener includes a limit nub extending outward from each of the wing plates of the seat. An indent is defined in each of the cams of the side plates to correspond to the limit nub and receive the limit nub when releasing the strap to lock the lever and the seat together to reduce the shearing force between the lever and the seat and the pivot pin. Consequently, the pivot holes in the seat and the lever do not wear as much and maintain good concentricity.

2 Claims, 6 Drawing Sheets

STRAP TIGHTENER

BACKGROUND OF THE INVENTION

1. Field of the Invention

The present invention relates to a tightener, and more particularly to a strap tightener that has less wear between the pivot pin and the lever and the wing plates when releasing the strap.

2. Description of Related Art

With reference to FIGS. 5 and 6, a conventional strap tightener in accordance with the prior art comprises a base plate (50), a U-shaped seat (60), a lever (70) and a ratchet device. The U-shaped seat (60) is mounted on the base plate (50). The lever (70) is pivotally mounted on the seat (60) by a pivot pin (80). The ratchet device is mounted between the lever (70) and the seat (60).

The base plate (50) has a distal edge and a proximal edge parallel to each other. The distal edge of the base plate (50) is bent to form a hook (500). A slot (52) with two ends is defined in the base plate (50) near and parallel to the proximal edge through which a strap (100) can pass. A pair of ears (51) extends perpendicular from the base plate (50) in a direction opposite to the hook (500) near the distal edge of the base plate (50). The ends of the slot (52) correspond to the respective ears (51). Each of the ears (51) has a through hole (511) defined to align with the through hole (511) in the other ear (51). A bore (53) is defined in the base plate (50) between the pair of ears (51) and the slot (52).

The seat (60) includes two wing plates (600) parallel to each other. The wing plates (600) are oriented perpendicular to the proximal and distal edges of the base plate (50), have first ends near the distal edge of the base plate (50) and second ends near the proximal edge of the base plate (50). The wing plates (600) are connected by a bridge (601) to form a U-shape. A retaining plate (602) extends upward from one side of the bridge (601) near the pair of ears (51), and a hole (604) is defined in the retaining plate (602). A through hole (61) is defined in the first end of each wing plate (600) to correspond to the through holes (511) in the ears (51). A through hole (603) is defined in the bridge (601) and corresponds to the bore (53) in the base plate (50). After the through holes (61) in the wing plates (600) align with the through holes (511) in the ears (51), a bolt (not numbered) extends through the bore (53) in the base plate (50) and the through hole (603) in the bridge (601). A pivot hole (62) is defined in the second end of each of the wing plates (600), and a stop (63) extends from the second end of each of the wing plates (600). The stop (63) has a slot (631) defined near the middle portion of the stop (63). A guide slot (64) is defined in each of the wing plates (600) between the through hole (61) and the pivot hole (62). The guide slot (64) is aligned with a radius of the pivot hole (62) in the corresponding wing plate (50) and an extended diameter of the hole (604) in the retaining plate (602) that is perpendicular to both wing plates (600). A brake pawl (65) has two opposite sides respectively sliding in the guide slots (64) and a stub (651) extending through the hole (604) in the retaining plate (602). A spring (652) is mounted around the stub (651) of the brake pawl (65) between the brake pawl (65) and the retaining plate (602) to push the brake pawl (65) toward the pivot hole (62).

The lever (70) has a distal end and a proximal end and includes two side plates (71) perpendicular to and integrally formed with a connecting plate (72) at the distal end. A retaining plate (74) extends perpendicular from the connecting plate (72) and has a through hole (741) defined in the retaining plate (74). The internal width of the two side plates (71) is greater than the external width of the two wing plates (600) such that a gap is formed between the corresponding side plates (71) and wing plates (600). A pivot hole (not shown) is defined in a proximal end of the side plates (71) and corresponds to the pivot hole (62) in the seat (60). The diameter of the pivot hole in the lever (70) is the same as the diameter of the pivot hole (62) in the seat (60). A cam (73) extends from the proximal end of the side plate (71) to push the brake pawl (65). A guide slot (711) is defined in the side plate (71) aligned with the center of the pivot hole in the side plate (71) and an extended diameter of the through hole (741) in the retaining plate (74) perpendicular to the side plates (71).

Two ratchet wheels (81) are respectively mounted in the gaps between the two side plates (71) and the two wing plates (600). A pivot pin (80) extends through the pivot hole in the lever (70), the pivot hole (62) in the wing plate (600) and the two ratchet wheels (81) to attach the lever (70) and the two ratchet wheels (81) to the seat (60). The pivot pin (80) includes two half-round bars (801), and each of the ratchet wheels (81) has two half-round holes (not shown) defined to correspond to each other and allow the half-round bar (801) to extend through corresponding half-round holes. Consequently, the pivot pin (80) is rotated by the two ratchet wheels (81) when the lever (70) is pivoted. The ratchet wheel (81) includes multiple teeth each having a sliding side and a limiting side. The limiting side engages with the brake pawl (65) so that the ratchet wheel (81) rotates only in the direction from the brake pawl (65) to the lever (70). The pivot pin (80) includes two opposite ends. A locking hole (802) is defined in each end to receive a locking pin (82) that is secured on the pivot pin (80) to prevent the pivot pin (80) from detaching from the seat (60) and the lever (70).

To operate the strap tightener, the ratchet wheel (81) is stopped by the brake pawl (65) when the lever (70) is pivoted toward the hook (500). A drive pawl (75) has two opposite sides sliding in the guide slot (711) in the side plate (71) of the lever (70). A stub (751) extends through the through hole (741) in the retaining plate (74) on the lever (70) from the drive pawl (75). A spring (752) is mounted around the stub (751) and between the drive pawl (75) and the retaining plate (74) to push the drive pawl (75) to engage with the ratchet wheel (81). The ratchet wheel (81) is rotated to drive the pivot pin (80) to roll the strap (100) when the lever (70) is pivoted away from the hook (500).

To release the tension on the strap, the lever (70) is moved outward relative to the hook (500) and the drive pawl (75) is moved to abut the stop (63). Then the user must press the drive pawl (75) toward the distal end of the lever (70) and simultaneously move the lever (70) until the end of the drive pawl (75) is received in the slot (631) in the stop (63). At the same time, the cam (73) in the lever (70) presses the brake pawl (65) away from the ratchet wheel (81) to release the ratchet wheel (81). With neither the brake pawl (65) nor the drive pawl (75) engaging the ratchet wheel (81), the user can pull the strap (100) through the strap tenser.

With reference to FIG. 6, the spring (652) pushes the brake pawl (65), and the brake pawl (65) actuates the cam (73) on the lever (70). The spring (752) pushes the drive pawl (75) and the drive pawl (75) actuates the stop (63) on the seat (60). Consequently, a shearing force formed by the lever (70) and the seat (60) due to the restitution force of the springs (652, 752) actuates the pivot pin (80) so that the friction between the seat (60) and the lever (70) and the pivot pin (80) is raised. The increased friction may shorten the useful life of the strap tightener.

The present invention has arisen to mitigate and/or obviate the disadvantages of the conventional strap tightener.

SUMMARY OF THE INVENTION

The main objective of the present invention is to provide an improved strap tightener. A limit nub extends outward from each of the wing plates of the seat. An indent is defined in each of the cams of the side plates to correspond to the limit nub and receive the limit nub when releasing the strap to fix the position of the lever with respect to the seat. Consequently, the pivot holes in the seat and the lever have a good concentricity to reduce the shearing force between the lever, the seat and the pivot pin.

Further benefits and advantages of the present invention will become apparent after a careful reading of the detailed description with appropriate reference to the accompanying drawings.

DETAILED DESCRIPTION OF THE INVENTION

Figure 1:
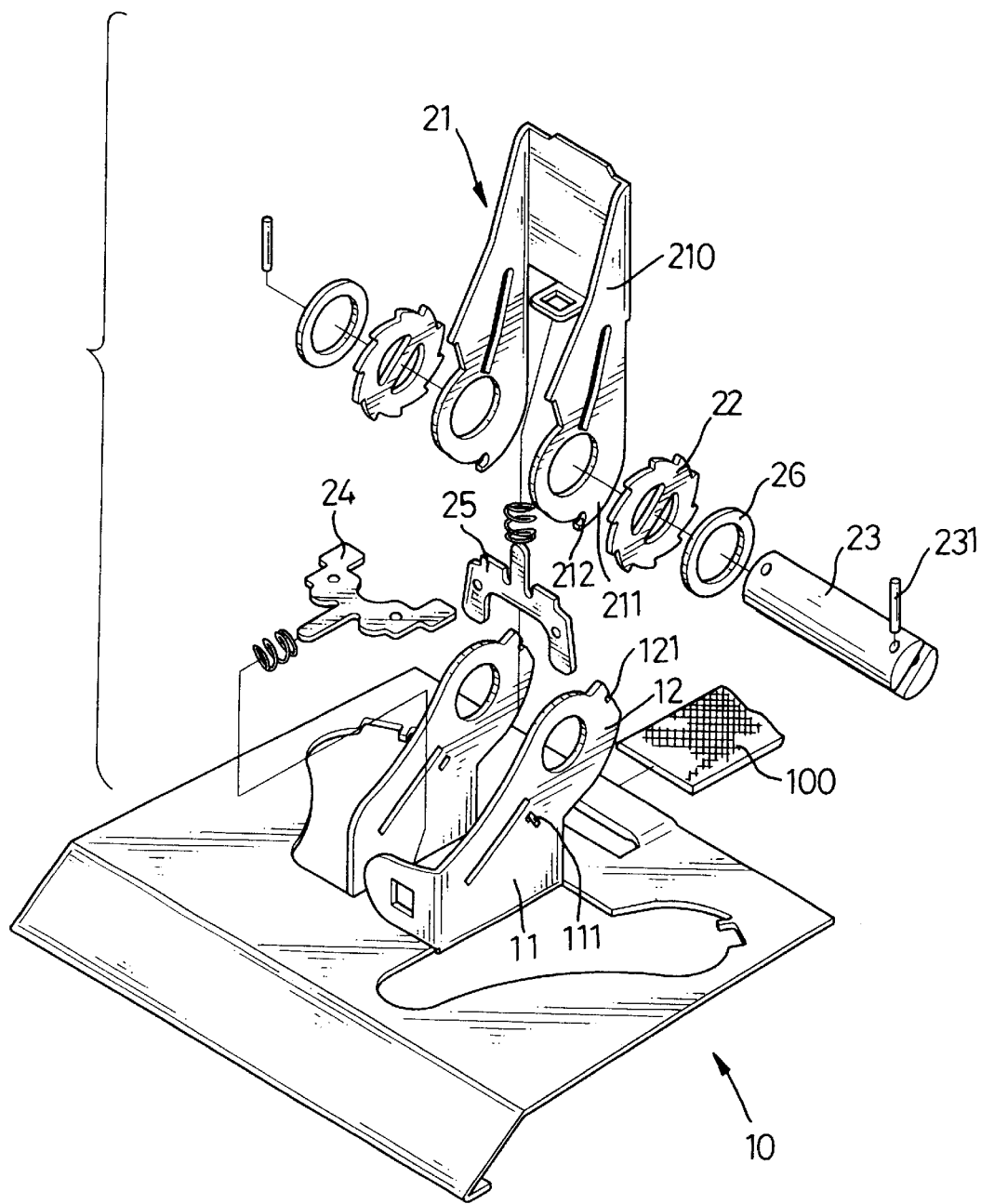
FIG. 1 is an exploded perspective view of a strap tightener in accordance with the present invention.
Figure 2:
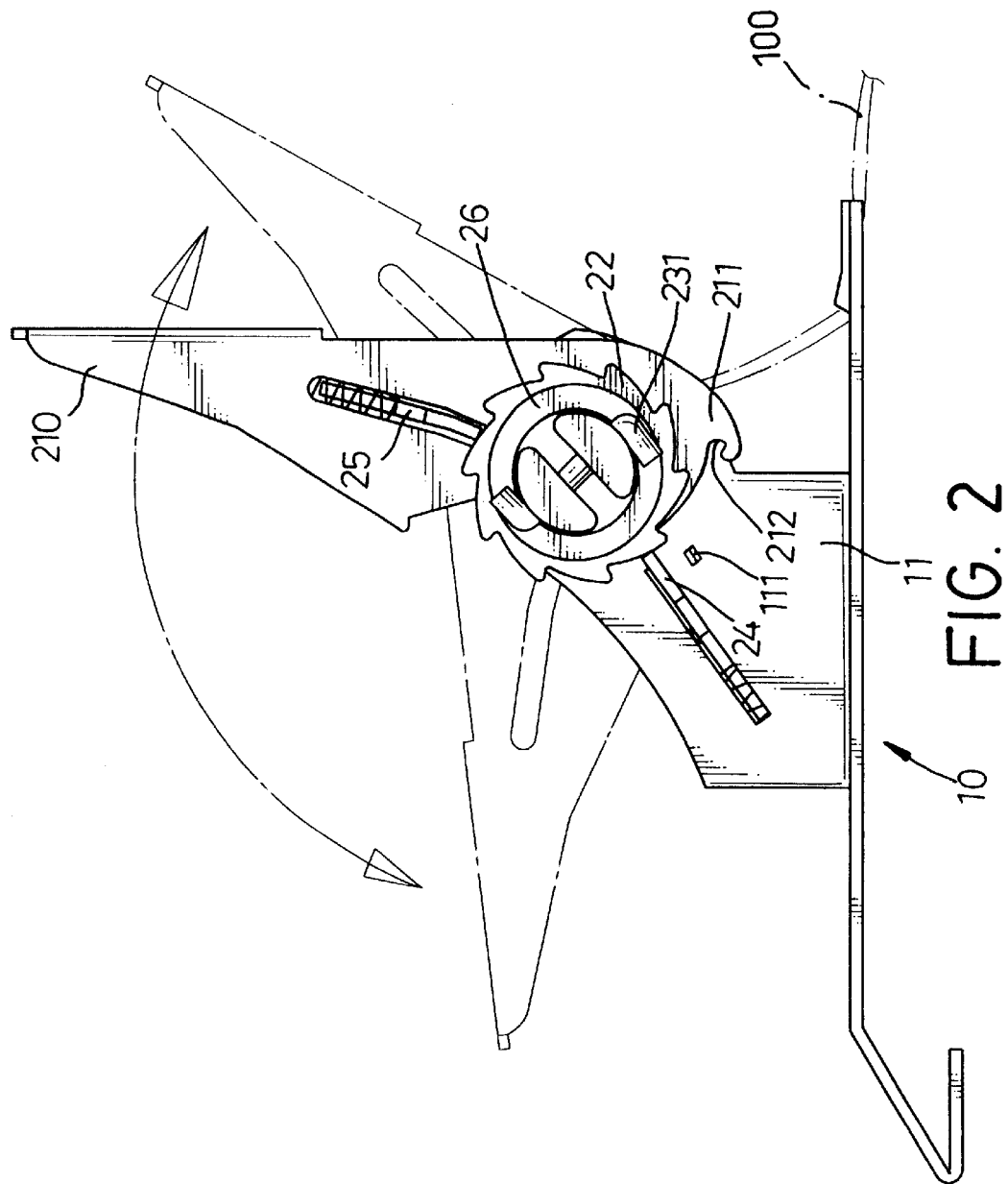
FIG. 2 is an operational side plan view of the strap tightener in FIG. 1.

With reference to the drawings and initially to FIGS. 1 and 2, a strap tightener in accordance with the present invention has a structure similar to the conventional strap tightener and comprises a base (10) and a lever (21) pivotally mounted on the base (10).

The base (10) includes two parallel wing plates (11). Each wing plate (11) has an interior side, an exterior side, a proximal edge and a distal edge with the proximal edge attached to the base (10) and the wing plate (11) extending perpendicular from the base (10). The interior sides of the wing plates (11) face each other, and the exterior sides face away from the other wing plate (11). A stop (12) is formed on and extends from the distal edge of the wing plate (11). A notch (121) is defined in the stop (12). Each of the wing plates (111) has a limit nub (111) extending perpendicular from the exterior side.

The lever (21) is pivotally mounted on the base (10) by a pivot pin (23) respectively extending through the wing plates (11) and the lever (21). The lever (21) includes two side plates (210) having a distal end connected by a handle and an enlarged proximal end having a cam (211) extending from the proximal end of the side plate (210). Each of the side plates (210) has an internal side in contact with an external side of each of the wing plates (11). Each cam (211) has an indent (212) defined to engage with the limit nub (111) on the corresponding wing plate (11) when releasing the strap (100). Two ratchet wheels (22) and two washers (26) are respectively mounted on the pivot pin (23). One side of the ratchet wheel (22) is in contact with the external side of the corresponding side plate (210) of the lever, (21) and the other side of the ratchet wheel (22) is in contact with the washer (26). Two locking pins (231) respectively extend through and are secured on the two opposite ends of the pivot pin (23) to prevent the ratchet wheel (22) and the washer (26) from detaching from the pivot pin (23) and hold the lever (231) in place. A brake pawl (24) has two opposite sides respectively movably mounted in the wing plates (11) of the base (10) to stop the ratchet wheel (22) when the lever (21) is pivoted toward the base (10). A drive pawl (25) has two opposite sides respectively movably mounted in the side plates (210) of the lever (21) to rotate the ratchet wheel (22) and the pivot pin (23) to roll the strap (100) when the lever (21) is pivoted away from the base (10).

Figure 3:
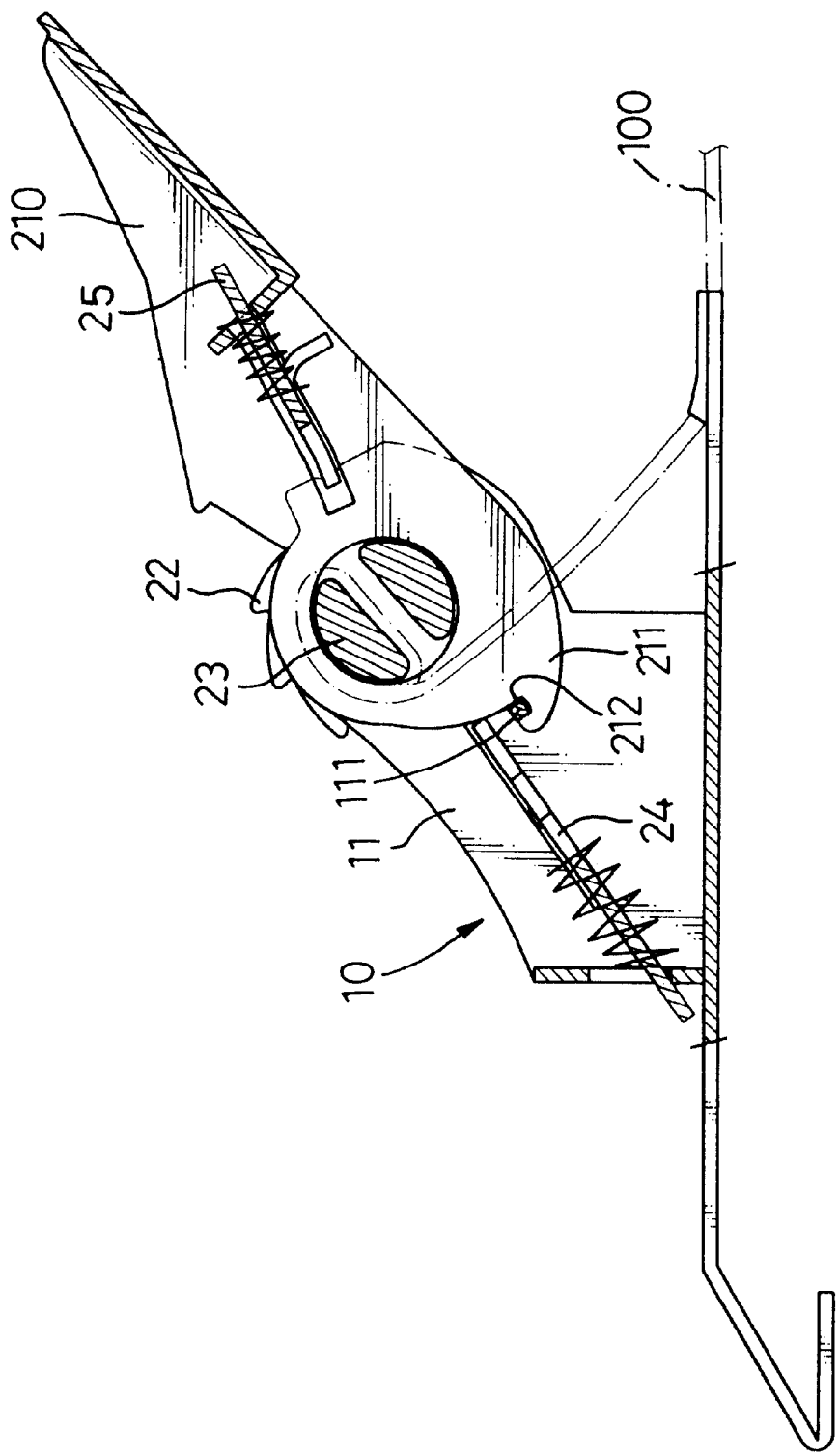
FIG. 3 is a side plan view in partial section of the strap tightener in FIG. 1.

With reference to FIG. 3, when releasing the strap (100), the lever (21) is pivoted outward relative to the base (10) and the drive pawl (25) is moved to abut the stop (12). Then the user must press the drive pawl (25) and simultaneously pivot the lever (21) until the drive pawl (21) is received in the notch (121) in the stop (12). At the same time, the cam (211) of the lever (21) presses the brake pawl (24) away from the ratchet wheel (22) to release from the ratchet wheel (22). Finally, the limit nub (111) of the wing plate (11) is received in the indent (212) in the side plate (210) of the lever (21) so that the shearing force of the conventional strap tightener disappears because the restitution force of the springs actuates the limit nub (111) of the base (10) not the pivot pin (23). With the brake pawl (24) and the drive pawl (25) disengaged from the ratchet wheel (22) and the user can easily pull the strap (100) back. Consequently, the strap tightener in accordance with the present invention has a longer life.

Figure 4:
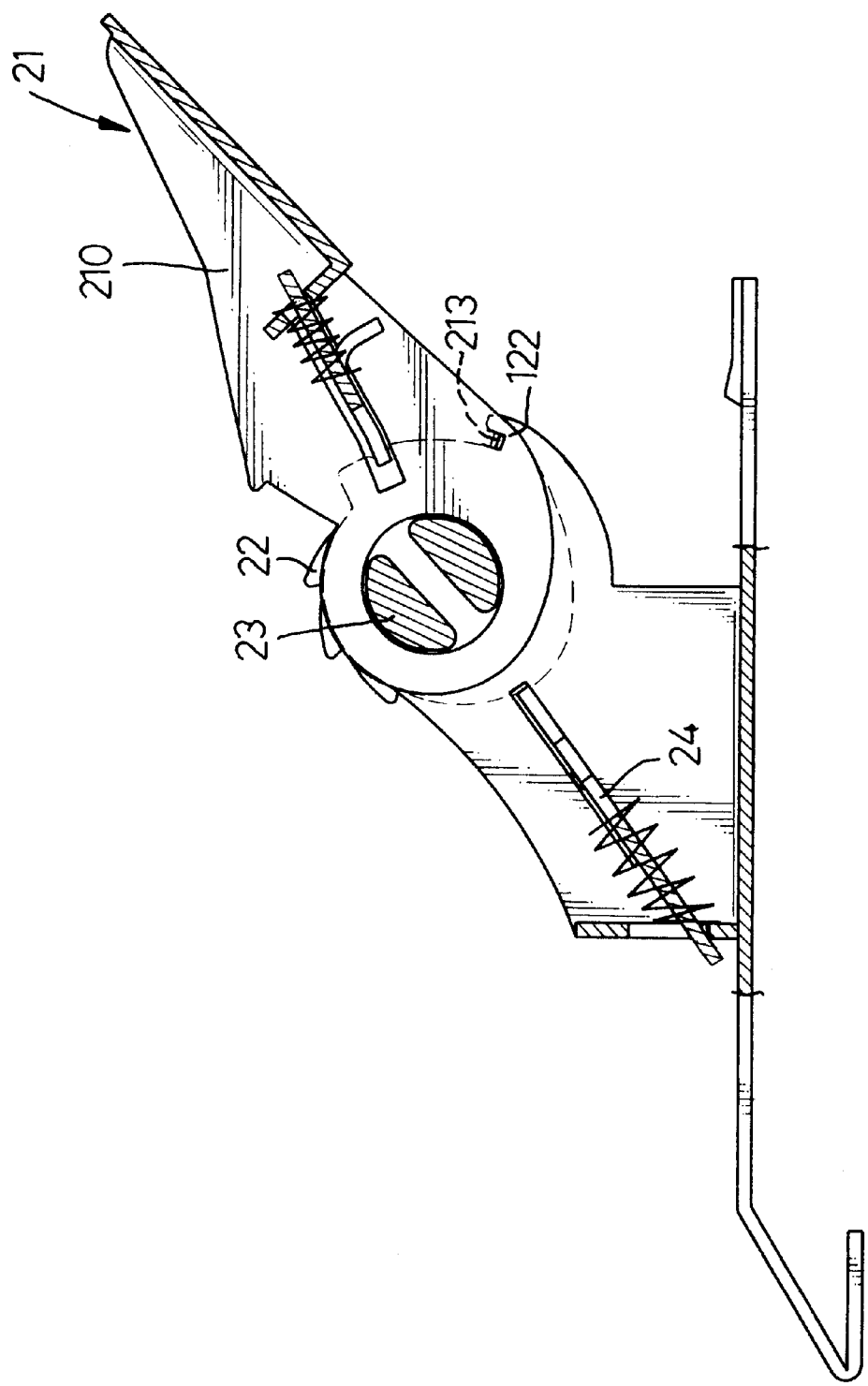
FIG. 4 is a side plan view in partial section of another embodiment of the strap tightener in accordance with the present invention.
Figure 5:
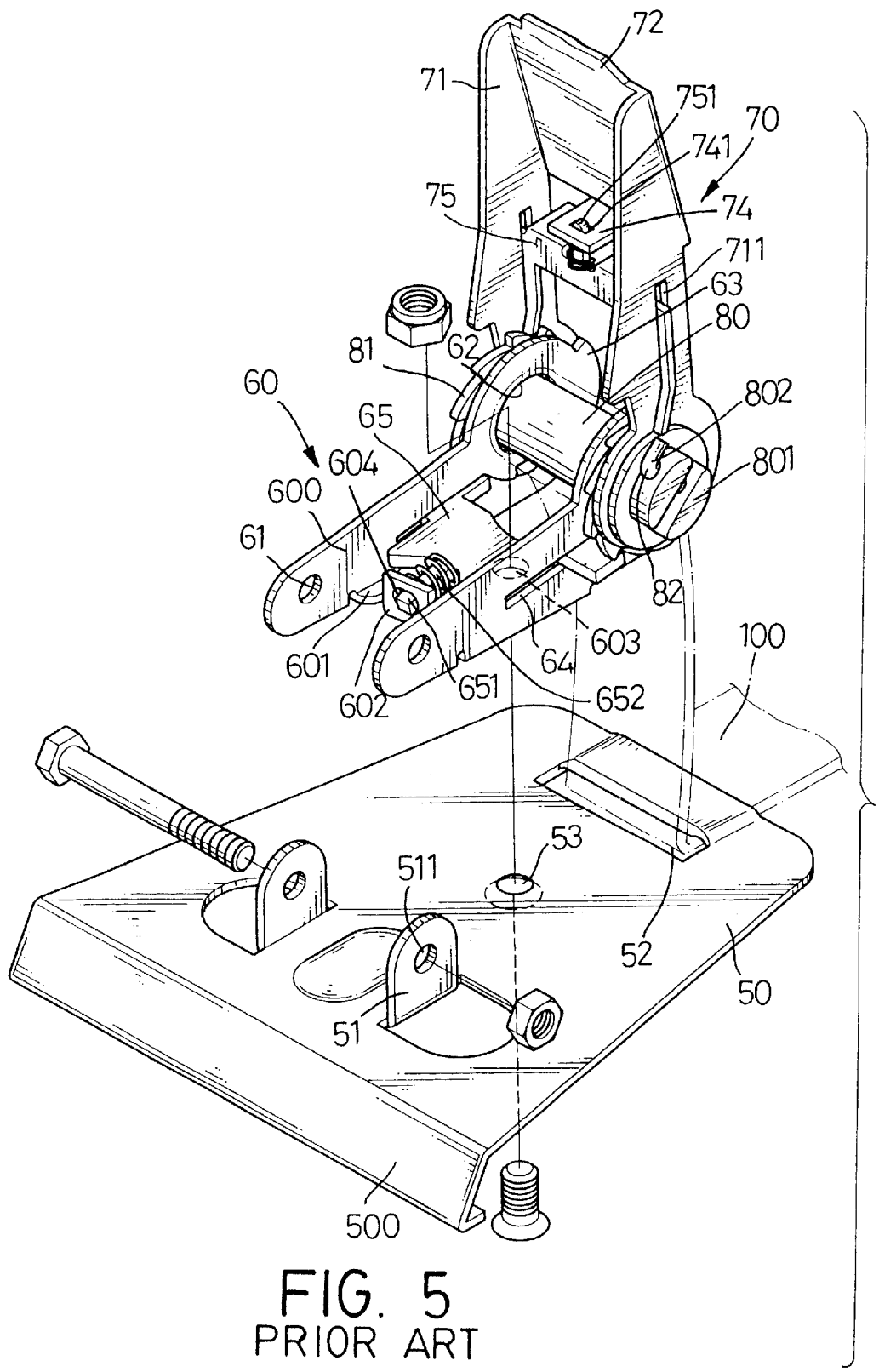
FIG. 5 is a partially exploded perspective view of a conventional strap tightener in accordance with the prior art.
Figure 6:
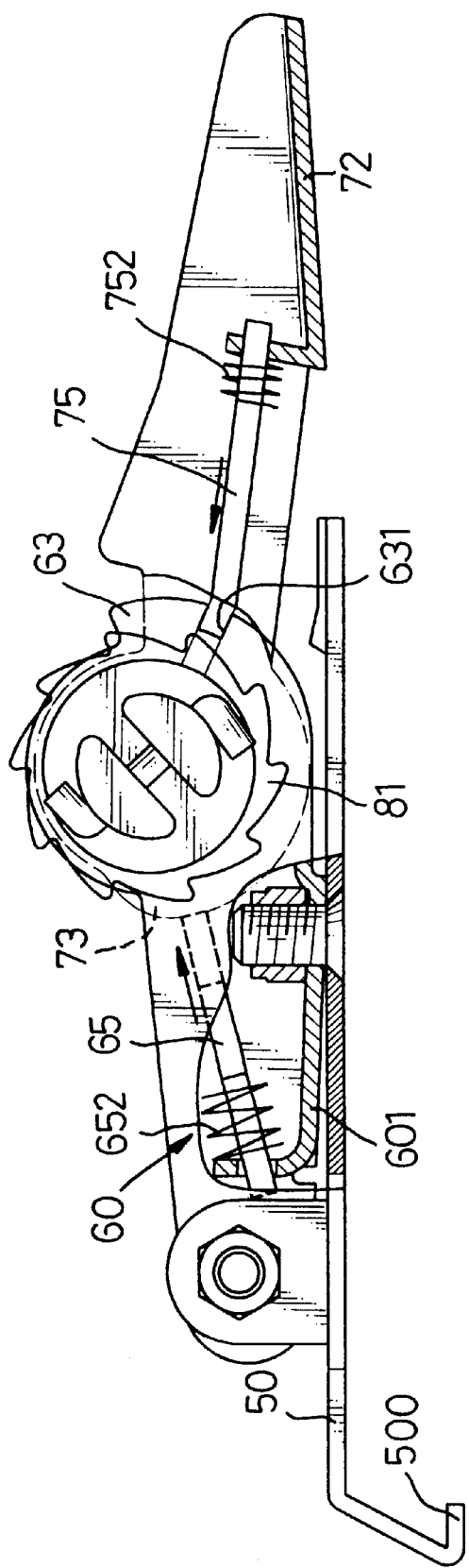
FIG. 6 is a side plan view in partial section of the strap tightener in FIG. 5.

With reference to FIG. 4, in another embodiment of the strap tightener in accordance with the present invention, a limit nub (213) extends from the internal side of each side plates (210) of the lever (21). Each of the wing plates (11) has an indent (122) defined in the stop (12) to engage the limit nub (213) on the lever (21) when releasing the strap (100). Then the shearing force of the conventional strap tightener disappears because the restitution force of the springs actuates the limit nub (213) of the lever (21) not the pivot pin (23).

Although the invention has been explained in relation to its preferred embodiment, it is to be understood that many other possible modifications and variations can be made without departing from the spirit and scope of the invention as hereinafter claimed.

What is claimed is:

1. A strap tightener comprising:
    a base including two wing plates parallel to each other and a brake pawl with two opposite sides respectively movably mounted in a corresponding wing plate, a stop extending from a free end of the wing plates and a notch defined in the stop;
    a lever pivotally mounted on the base by a pivot pin, the lever including two side plates parallel to each other, each of the side plates having a cam extending from one end of the side plate corresponding to the base, the pivot pin having two opposite ends respectively extending out of the side plate of the lever and the wing plate of the base, and each having a ratchet wheel and washer sleeved around the pivot pin;
    the brake pawl being movably mounted between the two wing plates of the base to stop the ratchet wheel when the lever moved back relative to the base; and a pawl movably mounted between the two side plates of the lever to drive the ratchet wheel and the pivot pin when the lever is moved away from relative to the base, the pawl has a top received in the notch of the wing plate when relaxing a strap; wherein the improvement comprises:
   a limit nub laterally extending out from each of the wing plates and an indent defined in the cam in each of the side plates to receive the limit nub on each of the wing plates when relaxing the strap.

2. A strap tightener comprising:

a base including two wing plates parallel to each other and a brake pawl with two opposite sides respectively movably mounted in a corresponding one of the wing plates, a stop extending from a free end of the wing plates and a notch is defined in the stop;

a lever pivotally mounted on the base by a pivot pin, the lever including two side plates parallel to each other, each of the side plates having a cam extending from one end of the side plate corresponding to the base, the pivot pin having two opposite ends respectively extending out of the side plate of the lever and the wing plate of the base, and each having a ratchet wheel and washer sleeved around the pivot pin;

the brake pawl being movably mounted between the two wing plates of the base to stop the ratchet wheel when the lever is moved back relative to the base; and a pawl movably mounted between the two side plates of the lever to drive the ratchet wheel and the pivot pin when the lever moved away from relative to the base, the pawl has a top received in the notch of the wing plate when relaxing a strap; wherein the improvement comprises:
   a limit nub laterally extending inwardly from each of the side plates of the lever and an indent defined in the stop to receive the limit nub on each of the side plates of the lever when relaxing a strap.

\* \* \* \* \*